United States Patent [19]

Alexandrovich

[11] Patent Number: 5,808,696

[45] Date of Patent: Sep. 15, 1998

[54] COLOR TELEVISION VIDEO SIGNAL REGENERATOR, INCLUDING THREE VIDEO SIGNAL REGENERATION CHANNELS, WITH THE INPUT OF ONE CHANNEL CAPABLE OF RECEIVING WIDER PASS-BAND SIGNALS THAN THE OTHER TWO CHANNELS

[76] Inventor: Antonov Alexandr Alexandrovich, 164 Gorkago St., apt.59, Kiev 252006, Ukraine

[21] Appl. No.: 495,603

[22] PCT Filed: Jan. 14, 1994

[86] PCT No.: PCT/UA94/00001

§ 371 Date: Oct. 23, 1995

§ 102(e) Date: Oct. 23, 1995

[87] PCT Pub. No.: WO94/17620

PCT Pub. Date: Aug. 4, 1994

[30] Foreign Application Priority Data

Jan. 15, 1993 [UA] Ukraine .................................. 94010061

[51] Int. Cl.[6] ........................................................ H04N 5/21
[52] U.S. Cl. .......................... 348/609; 348/621; 348/624; 348/630
[58] Field of Search ..................................... 348/606, 607, 348/621, 623, 624, 625, 627, 630, 235, 253, 256, 234, 659, 661, 664, 675, 676, 609; H04N 5/21, 5/205, 5/208

[56] References Cited

U.S. PATENT DOCUMENTS

| | | | |
|---|---|---|---|
| 4,148,059 | 4/1979 | Dillon et al. | 348/253 |
| 4,683,490 | 7/1987 | Strolle et al. | 348/609 |
| 4,979,041 | 12/1990 | Schreiber | 348/609 |
| 5,150,204 | 9/1992 | Yamazaki | 348/234 |
| 5,235,410 | 8/1993 | Hurley | 348/675 |
| 5,412,423 | 5/1995 | Ohashi | 348/234 |
| 5,483,294 | 1/1996 | Kays | 348/609 |

*Primary Examiner*—John K. Peng
*Assistant Examiner*—Jeffrey S. Murrell

[57] ABSTRACT

A video signal regenerator in color television comprises two video signal regeneration channels each of which has a video signal front detector (5–7) electrically connected to a driving input of a video holding sampler (1–3), while the third video signal regeneration channel has an input receiving a video signal of a pass-band wider than that of other video signals, which channel being analogous to the other regeneration channels and also comprising a video signal front detector (5–7) electrically connected to the driving input of the video holding sampler (1–3).

13 Claims, 18 Drawing Sheets

COLOR TELEVISION VIDEO SIGNAL REGENERATOR, INCLUDING THREE VIDEO SIGNAL REGENERATION CHANNELS, WITH THE INPUT OF ONE CHANNEL CAPABLE OF RECEIVING WIDER PASS-BAND SIGNALS THAN THE OTHER TWO CHANNELS

TECHNICAL FIELD

The present invention relates to information hardware, and particularly, to video signal regenerators in color television.

BACKGROUND ART

Knowm in the art is an aperture equalization device comprising a high-pass filter for transmitting high-order frequencies (SU, A, 558418). Concurrently with an increase in the steepness of video signal fronts, such device increases a high-frequency noise level.

Also known in the art is a video signal regenerator constructed as a microcircuit wherein two channels of relatively narrow-band input signals comprise video holding samplers whose driving inputs are electrically connected to video signal front detectors, while the third channel for processing a relatively wider-band video signal includes a delay line for leveling time position of video signal fronts at the outputs of all the three processing channels (JEEE Transaction on Consumer Electronics, Junke K. Four Standard Colour Decoder with Picture Improvement, 1983, CE-29, No. 4, p. 451–461).

This device regenerates only two of three input video signals. And the degree of regeneration is not sufficiently high, since the steepness of narrow-band input video signal fronts are not raised but to the steepness of the front of a relatively widest-band video signal. Furthermore, the degree of regeneration is not complete, since the video signals that are regenerated are not cleared of the high-frequency interference.

DISCLOSURE OF INVENTION

The present invention is based on the problem to provide a video signal regenerator in color television wherein a substantial decrease in rise time of regenerated video signals would be provided by a modified arrangement of basic elements of the regenerator.

This problem is resolved in that the video signal regenerator in color television comprising two video signal regeneration channels each of which has a video signal front detector electrically connected to a driving input of a video holding sampler according to the present invention also comprises a third video signal regeneration channel having an input receiving a video signal of a passband wider than that of other video signals, which channel being similar to the other regeneration channels and also compising a video signal front detector electrically connected to the driving input of the video holding sampler.

It is advantageous to have electrical connection of the video signal front detector with the video holding sampler in each regeneration channel through a common OR circuit having inputs connected to the outputs of the video signal front detectors and the output connected to the driving inputs of the video holding samplers.

The video signal front detectors of all the regeneration channels may be combined with the OR circuit to form an integral picture edge detector the output of which is fed with a video signal of a wider band than the other video signals, the input of the picture edge detector may be fed with a luminance video signal, while the video input of each video holding sampler may be fed with a color video signal.

It is advantageous that the output of the OR circuit be coupled with the input of a squaring circuit the output of which be connected to the driving inputs of all the video holding samplers.

The video signal regenerator may appropriately comprise a low-pass filter having an output connected to the video input of at least one video holding sampler.

Each video signal regeneration channel may comprise a first adder having one input whereto a video signal is applied, while the other input is connected to the output of the video holding sampler, an integrating circuit, the video input thereof being connected to the output of the first adder, while the zero adjustment input being connected to the output of the squaring circuit or of the OR circuit, and a second adder, the inputs thereof being connected to the output of the integrating circuit and of the video holding sampler, while the output thereof being the output of a video signal regeneration channel.

Also, each video signal regeneration channel may comprise a second video holding sampler having a video input whereto a corresponding video signal is applied, while the driving input is connected to the output of the edge detector or of the OR circuit, a first adder, the inputs thereof being connected to the outputs of the first and the second video holding samplers, while the output thereof being connected to a low-pass filter, and a second adder, the inputs of which are connected to the output of the first video holding sampler and to the output of the low-pass filter.

It proved to be desirable that the video signal regenerator comprise a NOT circuit wherein the input is connected to the output of the OR circuit, while each video signal regeneration channel comprise a second video holding sampler having a video input whereto a video signal is applied, while the driving input is connected to the output of the NOT circuit, an electronic switching unit having video inputs whereto the outputs of the first and the second video holding samplers are connected, while the driving input thereof is connected to the output of the edge detector or of the OR circuit, a first adder having inputs connected to the outputs of the first video holding sampler and the electronic switching unit, while the output thereof is connected to the input of the low-pass filter, and a second adder having inputs connected to the output of the low-pass filter and of the electronic switching init, while the output thereof is an output of the video regeneration channel.

BRIEF DESCRIPTION OF DRAWINGS

Some embodiments of the present invention will now be described by way of example with reference to the accompanying drawings, in which.

BEST MODE FOR CARRYING OUT THE INVENTION

Figure 1:
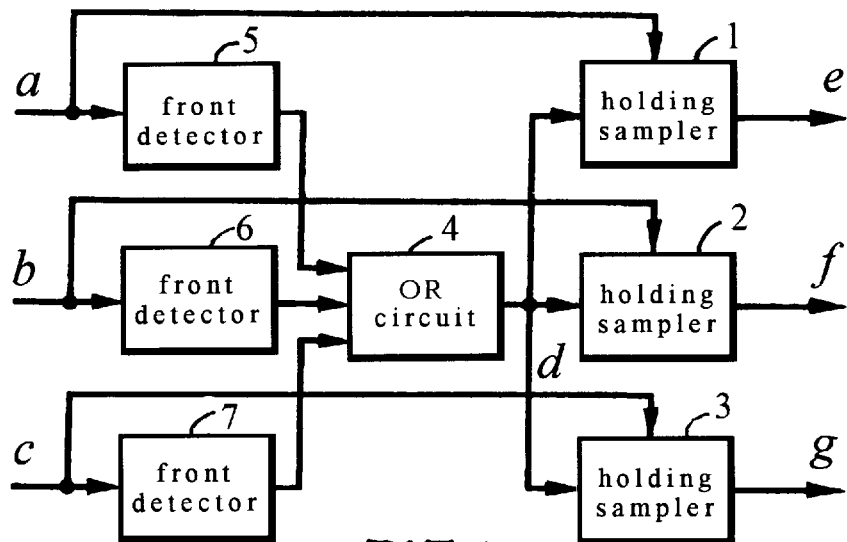
FIG. 1 is a functional block diagram of the video signal regenerator in color television according to the present invention.

A video signal regenerator in color television according to the present invention comprises three like signal regeneration channels, the input of each channel receiving a corresponding video signal, i.e. green, red, and blue, or a luminance signal and two color-difference signals. Referring to FIG. 1, there is shown a functional block diagram of such a regenerator which comprises, in each channel, a proper video holding sampler 1, 2, 3 such that their video inputs are inputs of the respective regeneration channel. Tie driving inputs of all the three video holding samplers 1, 2, 3 are coupled to the output of an OR circuit 4, the three inputs thereof being connected to the outputs of a first video signal front detector 5, a second video signal front detector 6, and a third video signal front detector 7 which are related to a corresponding signal regeneration channel. The inputs of the video signal front detectors 5, 6, 7 Respectively are connected to the inputs of the respective video holding samplers 1, 2, 3.

The video signal front detectors 5 and 6 and the OR circuit are connected to form an integral edge detector 8 (FIG. 2), the output thereof being connected to the driving inputs of the video holding samplers 1 through 3.

The detector 8 is of the same design as any of the video signal front detectors 5, 6, 7. The input of the edge detector 8 is fed with any of the relatively widest-band video signals, i.e. green or luminance video signal, preferably the latter one. If the same video signal is fed into the video input of the video holding sampler 1, their inputs may be combined (such functional connection is shown by the dotted lines in the drawings).

The output of the OR circuit 4 is connected to the input of a squaring circuit 9 (FIG. 3) having an output which is connected to the driving input of the video holding samplers 1 through 3.

Figure 4:
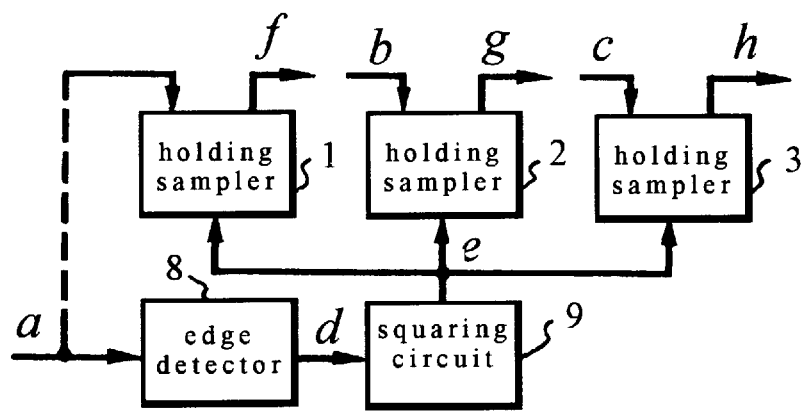
FIG. 4 is a further embodiment of the invention with a squaring circuit according to the invention.

The squaring circuit 9 is also connected to the output of the detector 8 (FIG. 4).

The squaring circuit 9 is constructed as a monostable multivibrator of any conventional functional circuit arrangement.

Figure 5:
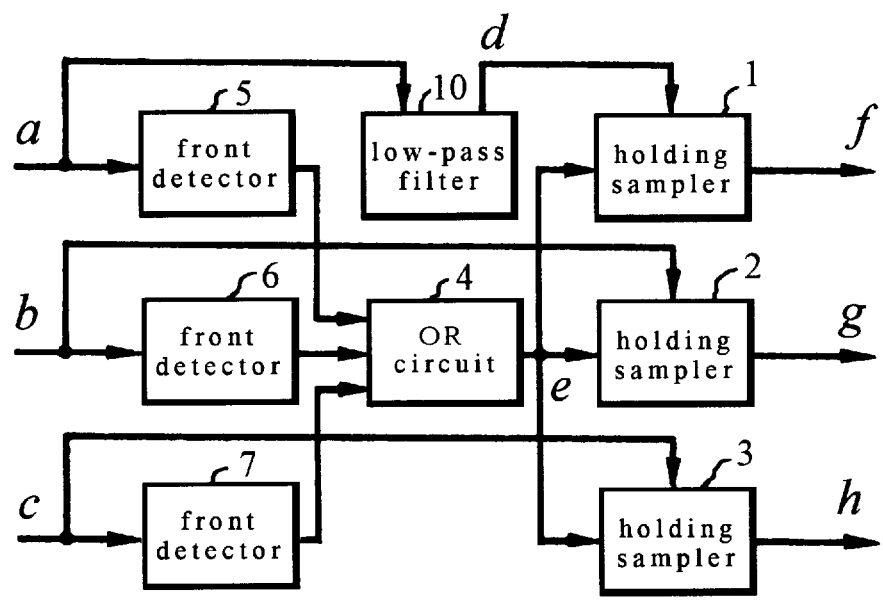
FIG. 5 is the same regenerator having a low-pass filter according to the invention.
Figure 6:
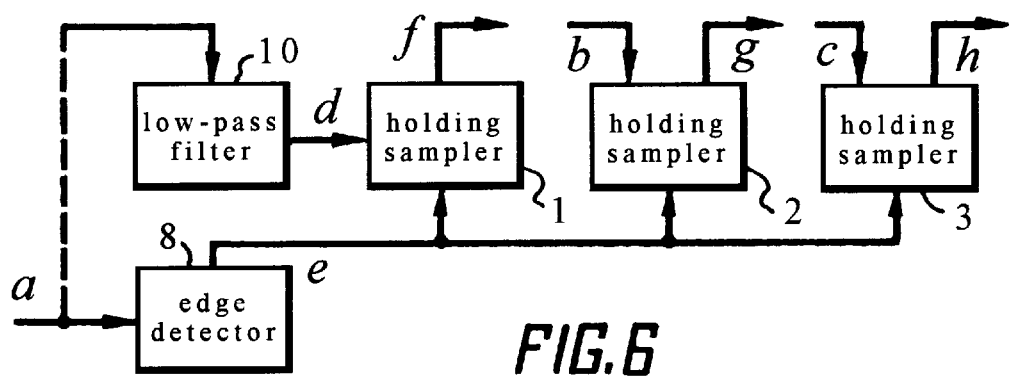
FIG. 6 is a still further embodiment of the invention incorporating a low-pass filter.

A relatively widest-band video signal of the three input video signals in color television is applied, in the video signal regenerator, to the video input of the respective video holding sampler through a low-pass filter 10 (FIGS. 5 and 6) which has an output connected to the video input of a respective video holding sampler, for example, the video holding sampler 1.

Figure 7:
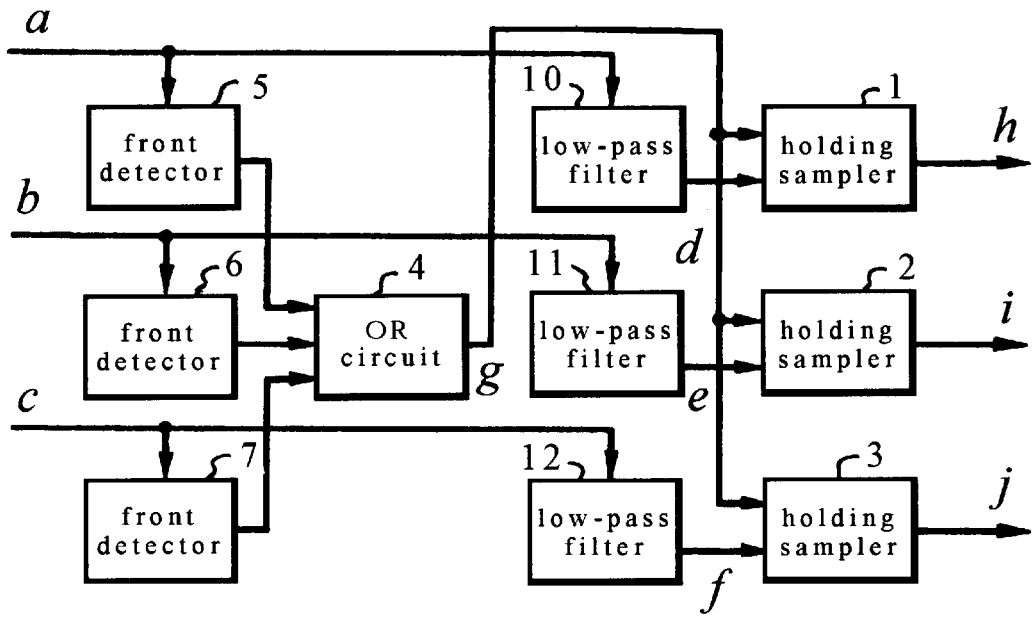
FIG. 7 is the same regenerator incorporating a low-pass filter in each regeneration channel.

The low-pass filters 10 (FIGS. 7, 8), 11, and 12, however, may be included in each channel, the output of each filter 10 through 12 being connected to the video input of the respective video holding sampler 1 through 3.

Figure 9:
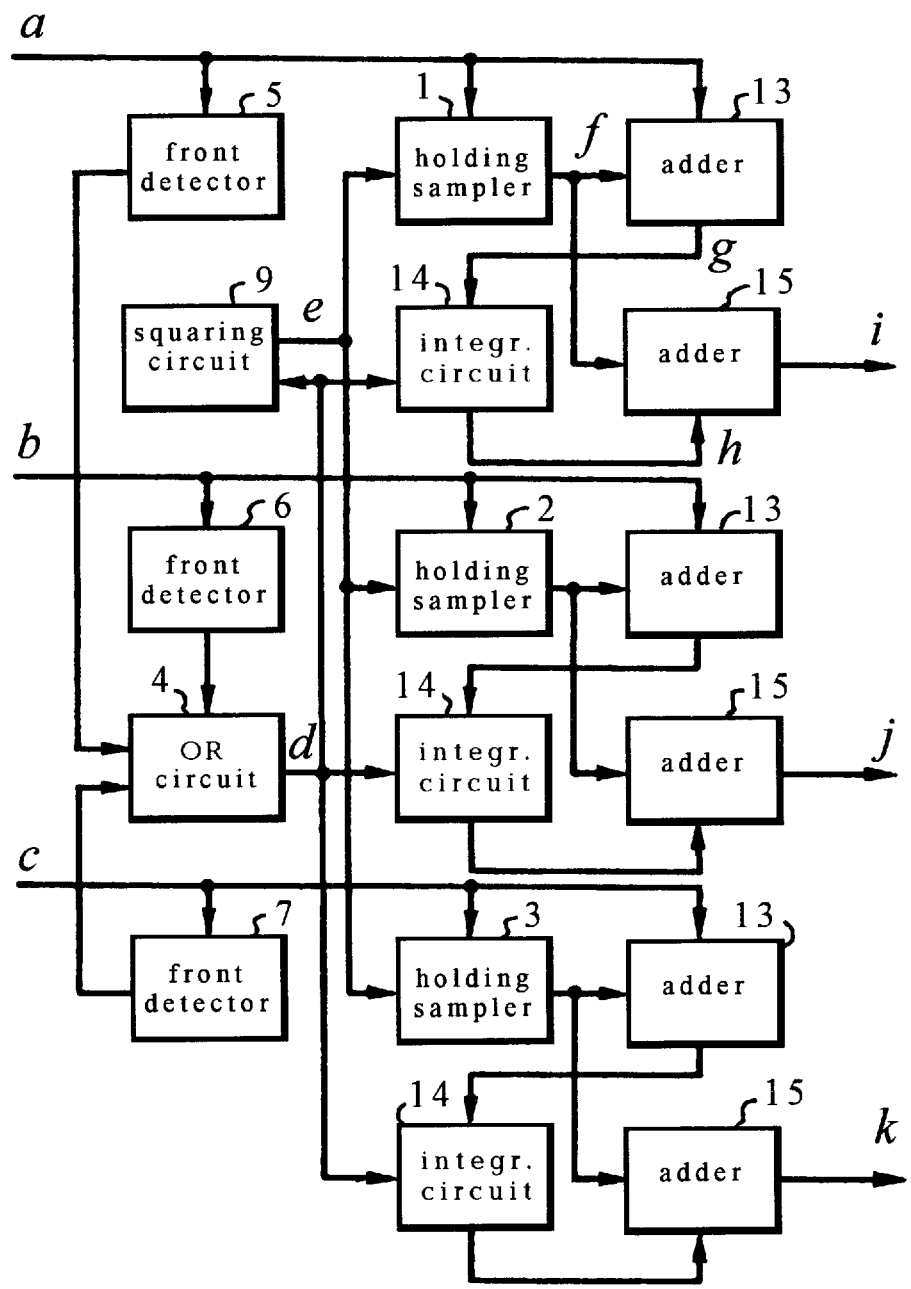
FIG. 9 is a functional block diagram incorporating adders according to the invention.

The regenerator, the functional block diagram thereof being shown in FIG. 9, is characterized in that each video signal processing channel has additional identical units, namely, a first adder 13, an integrating circuit 14, and a second adder 15. A respective video input of the regenerator as a whole and a respective output of the respective video holding sampler 1 or 2 or 3 are connected to the inputs of the adder 13, while the output of the same adder 13 is connected to the video input of the integrating circuit 14, the zero adjustment input thereof being connected to the output of the OR circuit 4. The inputs of the adder 15 are connected to the outputs of the integrating circuit 14 and of the video holding sampler 1 or 2 or 3 of their related channels.

In the embodiment of the invention where the regenerator incorporates the integral edge detector 8 (FIG. 10) the zero adjustment input of each integrating circuit 14 is connected to the output of the edge detector 8.

Figure 11:
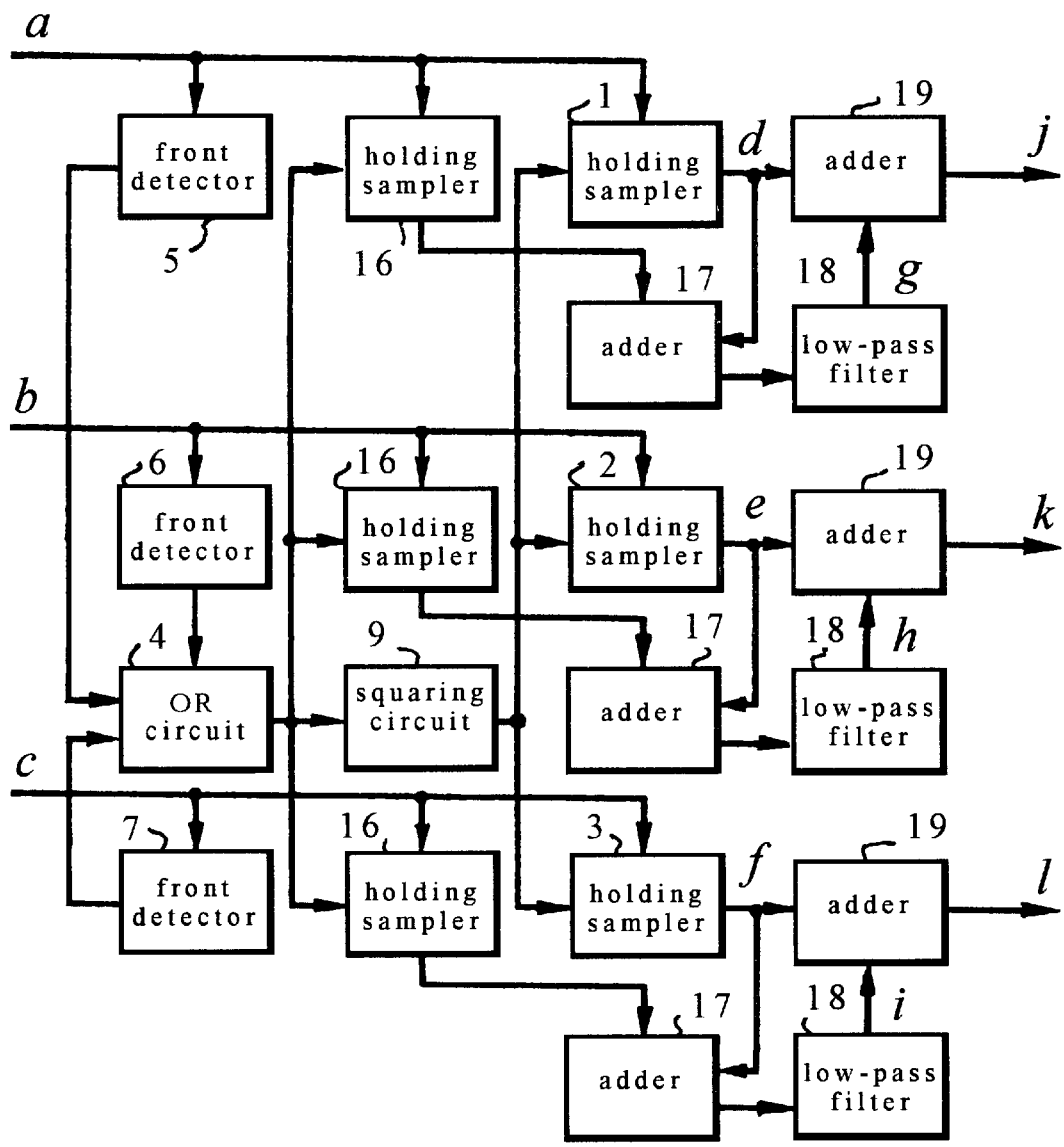
FIG. 11 is the same regenerator having differently designed channels according to the invention.
Figure 12:
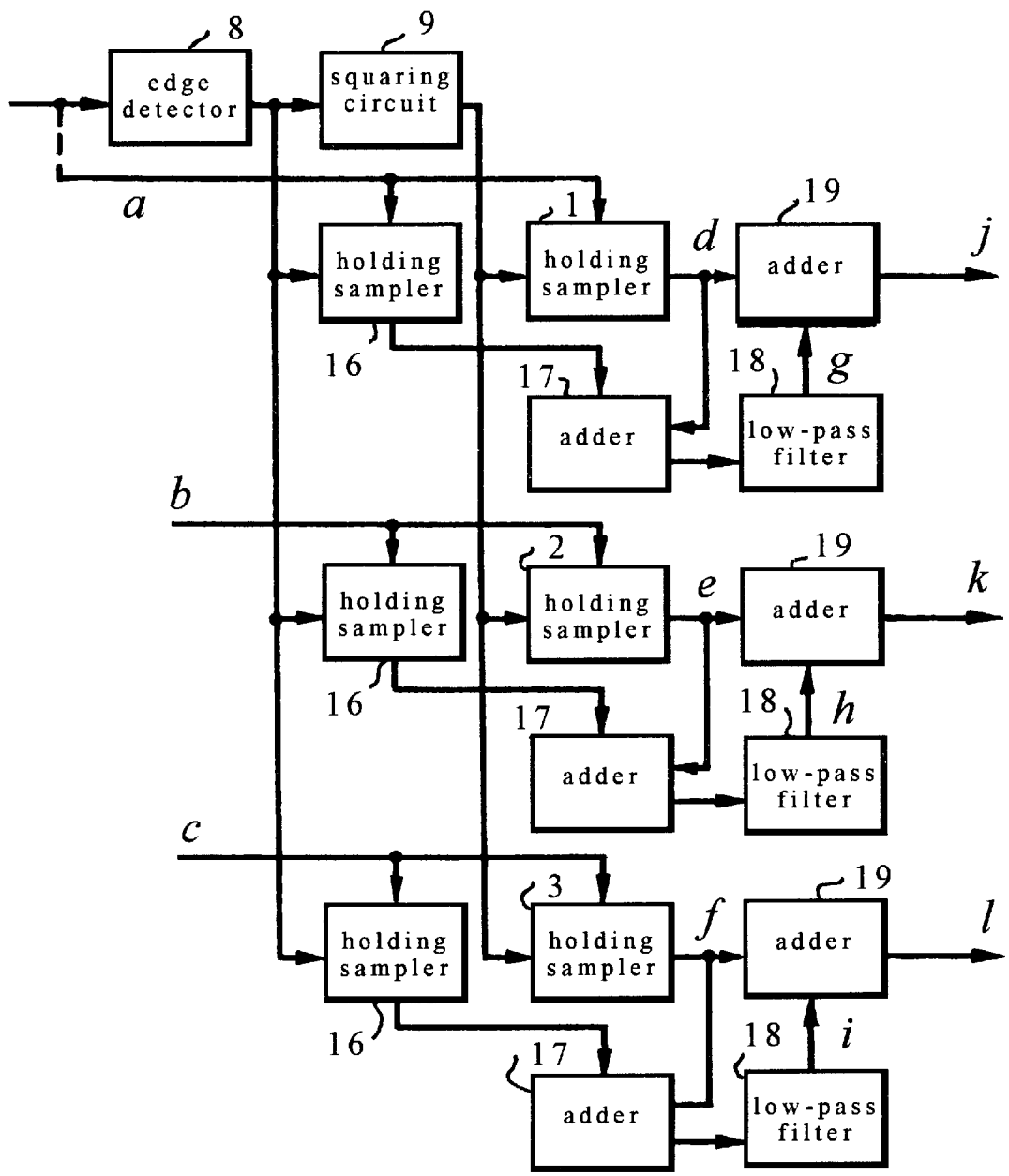
FIG. 12 is the same regenerator as shown in FIG. 11 but having an integral detector according to the invention.

Each video signal regeneration channel may be such as shown in FIG. 11 in the regenerator featuring the OR circuit 4 or as shown in FIG. 12 in the regenerator featuring the integral edge detector 8.

In these embodiments of the invention (FIGS. 11 and 12) each channel comprises a further video holding sampler 16 having a video input connected to the video input of the video holding sampler 1 (2, 3), a driving input connected to the output of the circuit 4 (FIG. 11) or to the output of the edge detector 8 (FIG. 12). The output of the video holding sampler 16 (FIGS. 11 and 12) is connected to the input of an adder 17, the other input thereof being connected to the output of the video holding sampler 1 (2, 3), while the output of the adder 17 is connected to the input of a low-pass filter 18.

Each channel has a second adder 19 the inputs of which are connected to the output of the video holding sampler 1 or 2 or 3 and of the low-pass filter 18, while the output thereof is an output of the regenerator for a respective video signal.

Figure 13:
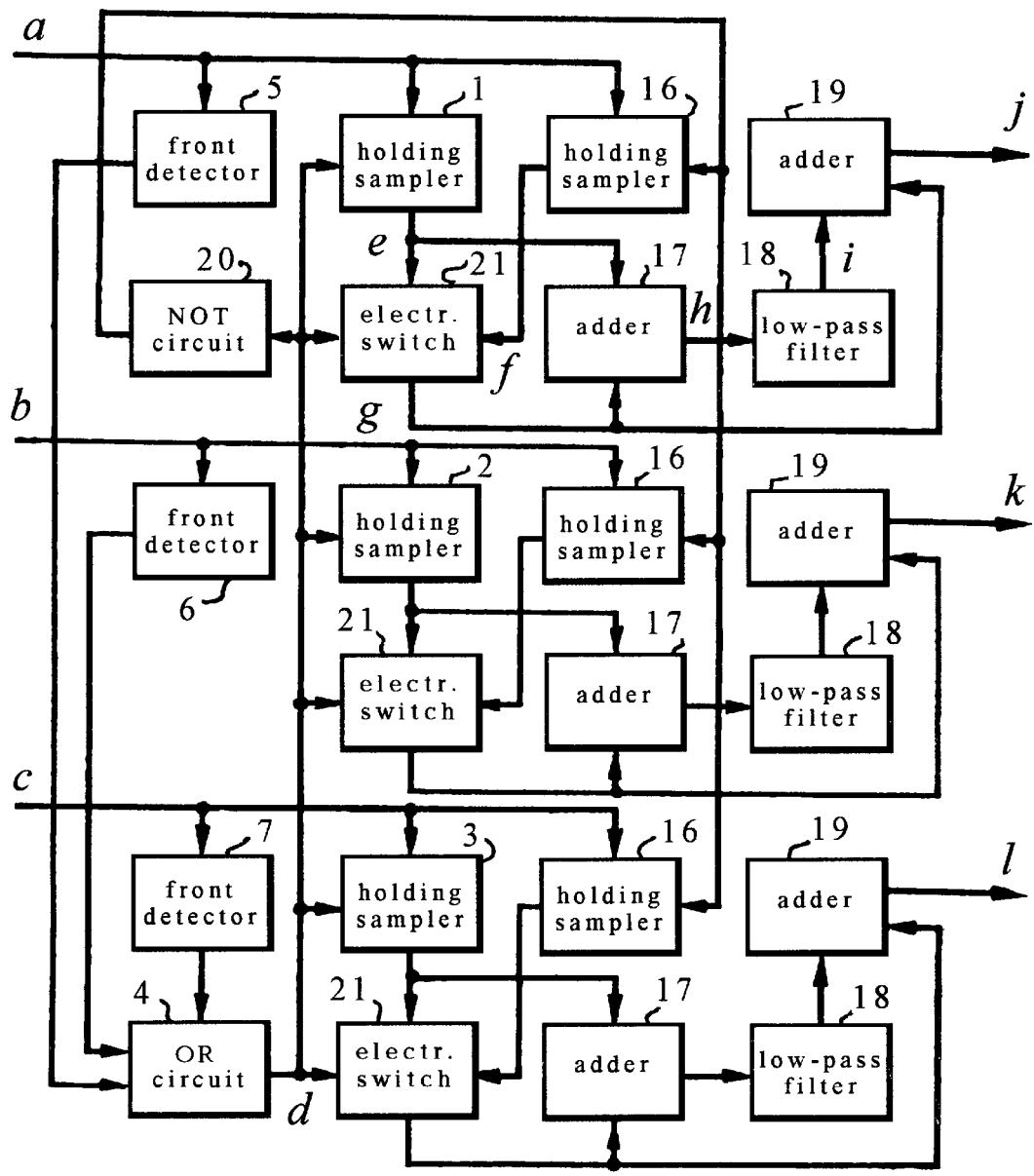
FIG. 13 is the same regenerator having a NOT circuit according to the invention.
Figure 14:
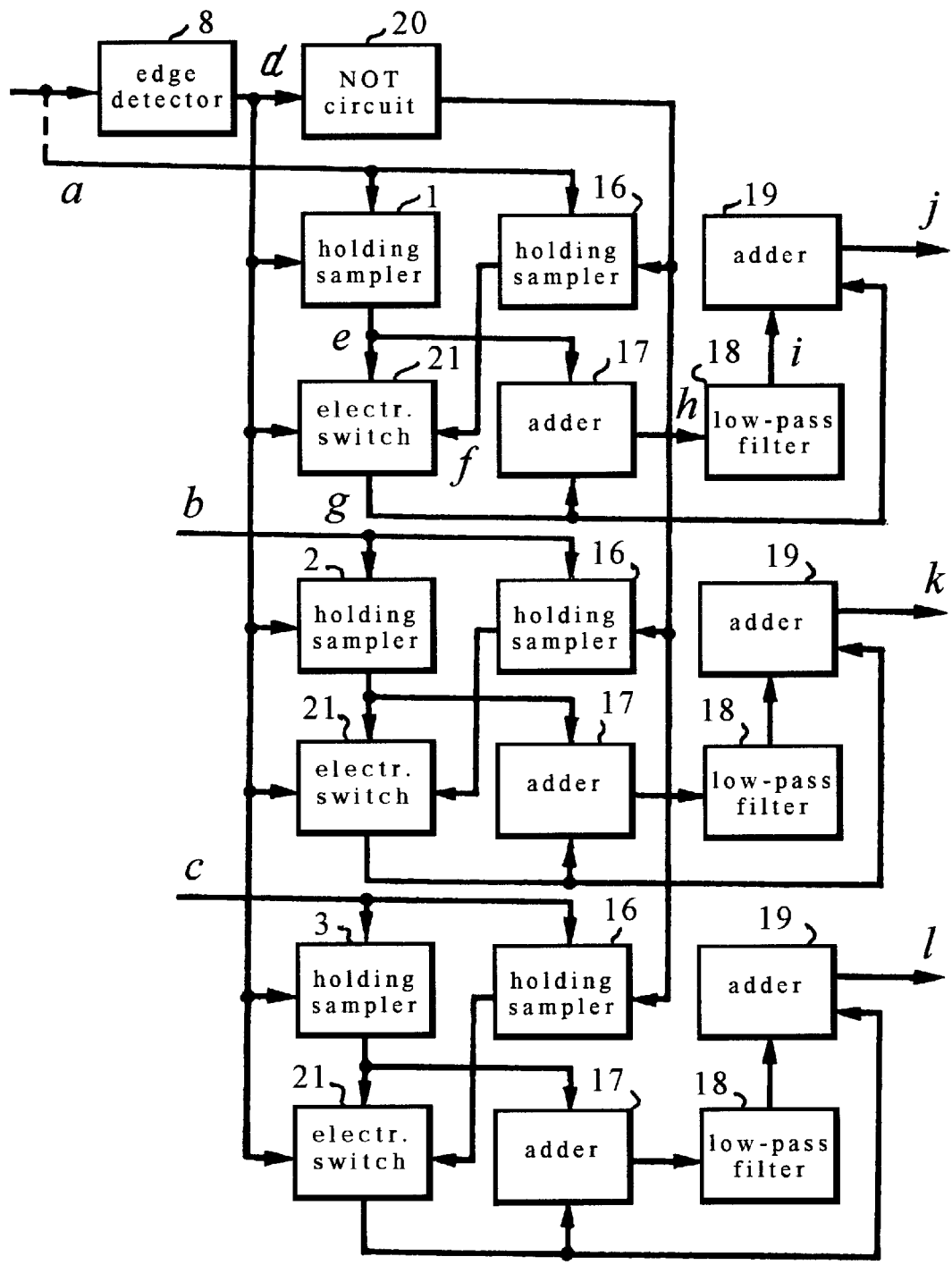
FIG. 14 is another construction of the regenerator having a NOT circuit according to the invention.

As shown in FIGS. 13 and 14, the alternative regenerators comprise a NOT circuit 20 with its input connected to the output of the OR circuit 4 (FIG. 13) or to the output of the edge detector 8 (FIG. 14), while its output is connected to the driving inputs of the video holding samplers 16 (FIGS. 13 and 14). The outputs of the first video holding sampler 1 (or 2 or 3) and of the second video holding sampler 16 in each channel are connected to the video inputs of a respective electronic switching unit 21, the driving input thereof being connected to the output of the OR circuit 4 (FIG. 13) and to the output of the edge detector 8 (FIG. 14). The outputs of the video holding sampler 1 (or 2 or 3) as well as those of the electronic switching unit 21 are connected to the inputs of the first adder 17 of the respective channel. The output of the first adder 17 is connected, through the low-pass filter 18, to one input of the second adder 19, while the output of the electronic switching unit 21 is connected to the other input of the second adder 19, the output thereof being an output of the entire regenerator for a respective video signal.

Figure 15:
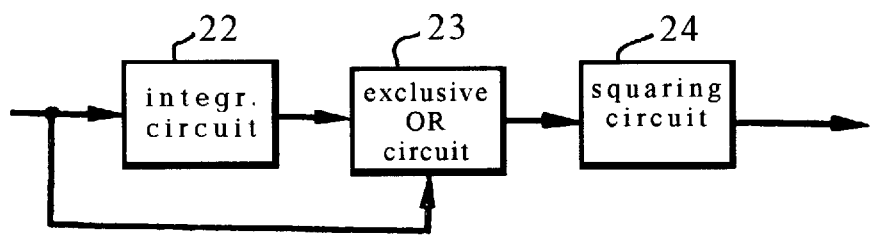
FIG. 15 is a functional block diagram of a video signal front detector.

The detector 1 (2, 3) shown in FIG. 15 by its functional block diagram, comprises the following series connected units: a fast time constant integrating circuit 22, an exclusive OR circuit 23 with the other input thereof being connected to the input of the integrating circuit 22, and a squaring circuit 24.

Figure 16:
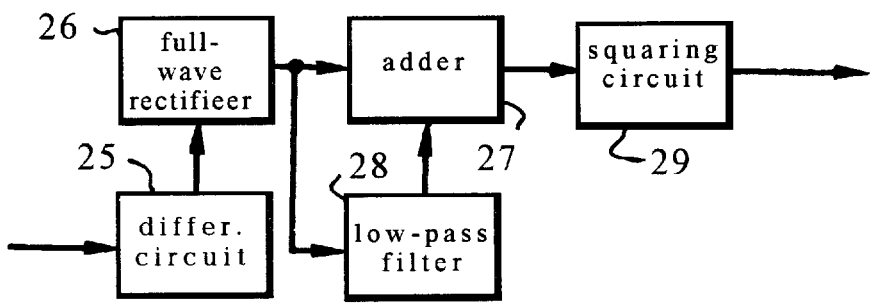
FIG. 16 is a further functional block diagram of a video signal front detector.

The edge detector 1, 2, 3 shown in FIG. 16 by its functional block diagram, comprises the following series connected units: a differentiating circuit 25, a full-wave rectifier 26, an adder 27 with the other input thereof being connected to the output of a low-pass filter 28, and a squaring circuit 29 such as a comparator. The input of the low-pass filter 28 is connected to the output of the full-wave rectifier 26.

The edge detector 8 (FIG. 1) comprises the differentiating circuit 25 (FIG. 16) based on a capacitor 29 and a resistor 30, the full-wave rectifier 26 connected as single-cycle limiters based on diodes 31, 32 and resistors 33, 34 to the inputs of an adder (algebraically rather than arithmetically) based on an operational amplifier 35. The adder 27 (also algebraically) is based on an operational amplifier 36. The low-pass filter 28 connected to its input, is based on a resistor 37 and a capacitor 38. The squaring circuit 29 connected to the output of the adder 27, is arranged as a comparator based on an operational amplifier 39. The video holding samplers 1 (2, 3) are identical arrangements of two followers based on operational amplifiers 40, 41 with an electronic switch 42 and a capacitor 43 interposed therebetween.

Apart from the above described regenerator based on analog and/or digital-analog units it is to be understood that the regenerator of the invention may be based on digital units.

The video signal regenerator in color television shown in FIG. 1 as a functional block diagram operates as follows.

Figure 18:
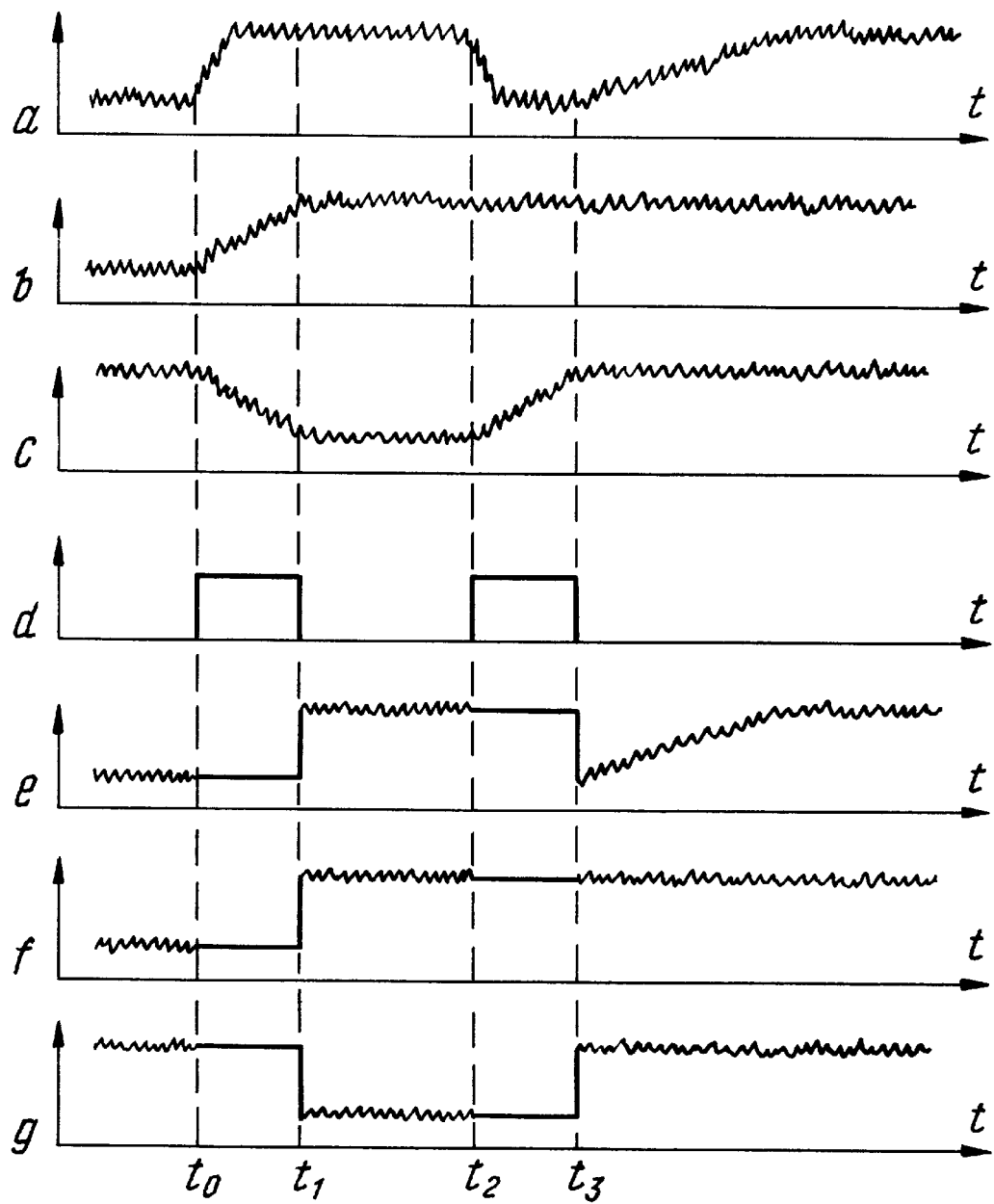
FIGS. 18*a, b, c, d, e, f, g* are timing diagrams illustrating the operation of the regenerator shown in FIGS. 1 and 2.

Video signals applied to the inputs of the video holding samplers 1, 2, 3 (FIGS. 18*a, b, c*) in response to the video signal fronts that are shaped in the video signal front detectors 5, 6, 7 and rectangular pulses that are shaped in the OR circuit 4 (FIG. 18*d*) over the time intervals of $t_0t_1$, $t_2t_3$ retain their initial state, otherwise they are reproduced unchanged at the output (FIGS. 18*e, f, g*). Since the time constant of the overcharge circuit of the capacitor in the video holding samplers 1, 2, 3 may be chosen very small, the steepness of the fronts of the output video pulses (green, red, blue or luminance and two color-difference pulses) shaped as above increases considerably.

Figure 2:
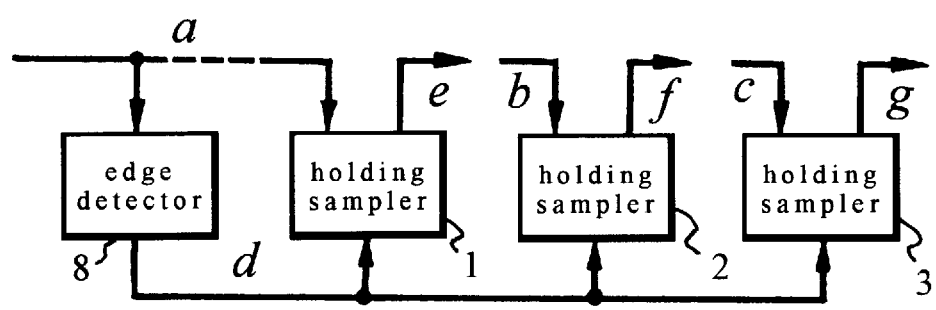
FIG. 2 is the regenerator of the invention having an integral detector according to the invention.

In an arrangement represented by its functional block digram in FIG. 2, rectangular pulses that drive the video holding samplers 1, 2, 3 are shaped in the edge detector 8 to represent the edges of the relatively big pels in the image outline, the input thereof being fed with the relatively widest-band video signal (FIG. 18*a*), preferably a luminance signal. Therefore, if a luminance signal and two color-difference signals are fed to the inputs of the video holding samplers 1, 2, 3, the input of the edge detector 8 may be combined (in FIG. 2, this functional connection is shown by the dotted lines) with the video input of the respective video holding sampler 1. In response to driving input pulses (FIG. 18*d*) which correspond to the fronts of the input video signals (FIGS. 18*a, b, c*) the video holding samplers 1, 2, 3 produce at their outputs (FIGS. 18*e, f, g*) a constant initial state over the time intervals $t_0t_1$, $t_2t_3$ and repeat the input signal otherwise.

Figure 3:
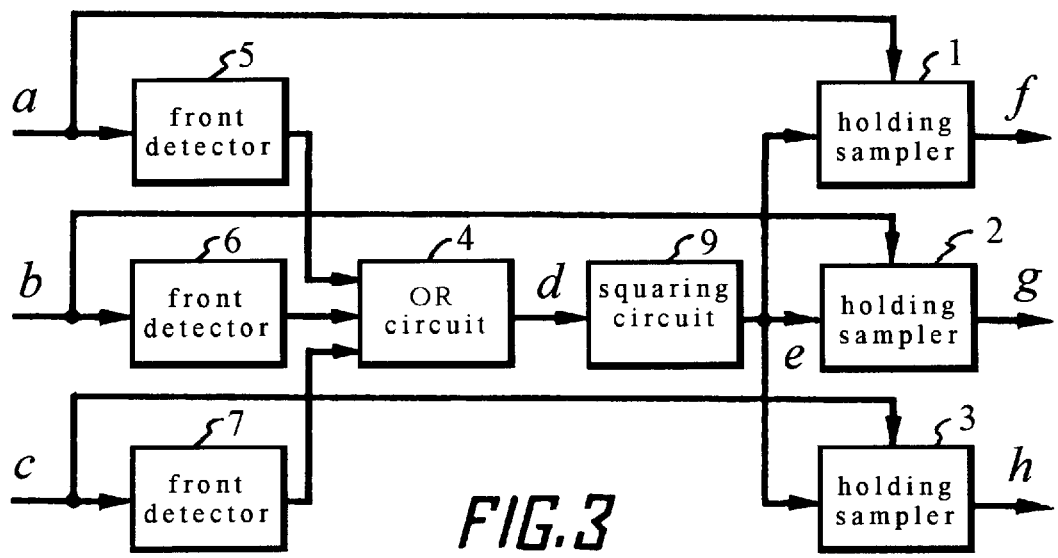
FIG. 3 is an embodiment of the invention with a squaring circuit according to the invention.
Figure 19:
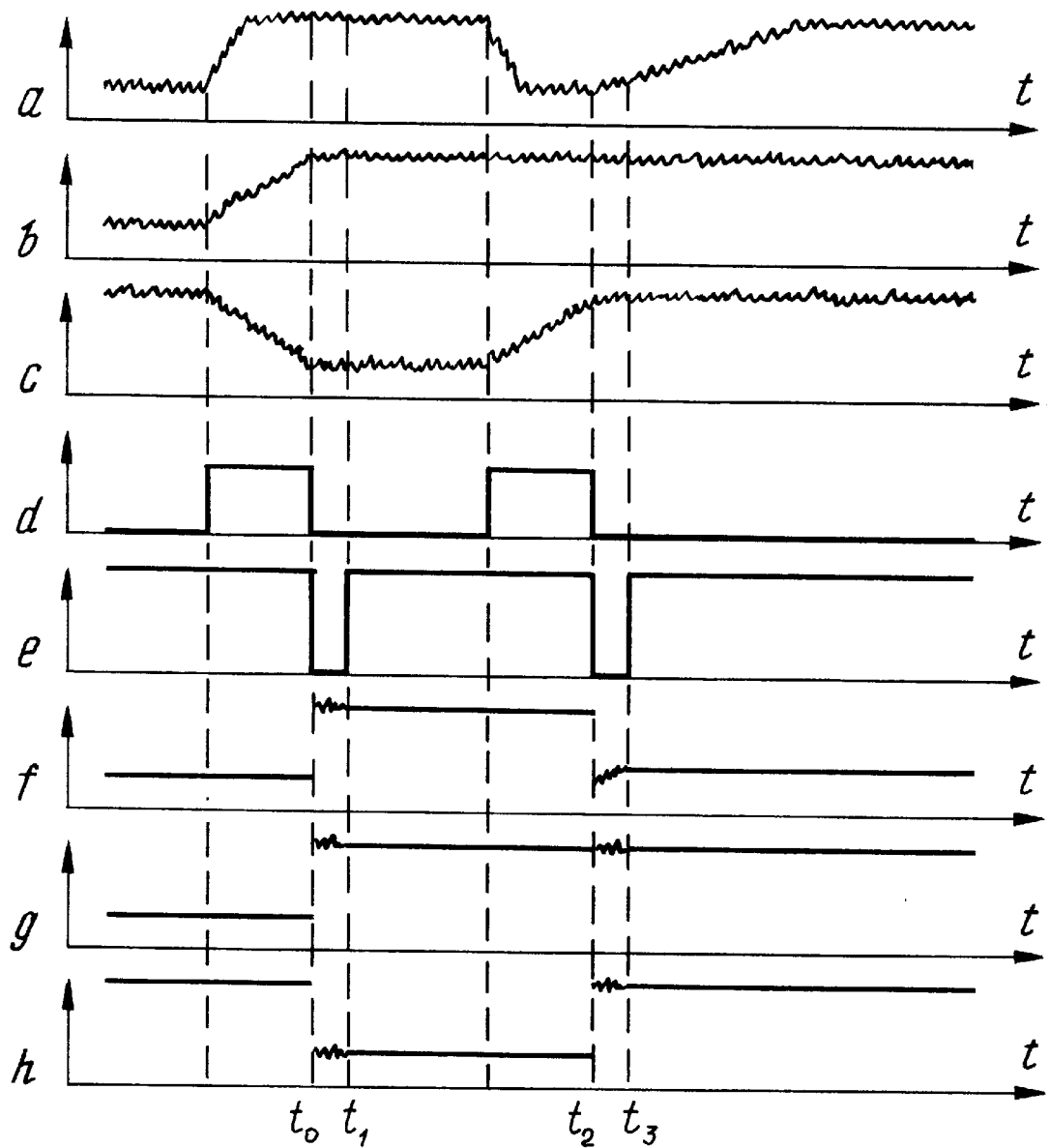
FIGS. 19*a, b, c, d, e, f, g, h* are timing diagrams illustrating the operation of the regenerator shown in FIGS. 3 and 4.

In an arrangement represented by its functional block diagram in FIG. 3 and FIG. 4 and its operation illustrated by timing diagrams in FIG. 19, while input video signals are shown in FIGS. 19*a, b, c*, the video signal front detectors 5, 6, 7 produce corresponding rectangular pulses as described hereinbelow and these pulses are combined in the OR circuit 4 (FIG. 19*d*). Unless it was done the edges representing different colors of the reproduced image would be offset to finally produce an inconsistent coloration. The output pulses of the OR circuit 4 drive the squaring circuit to produce constant duration pulses which control the video holding samplers 1, 2, 3. In doing this two specific ways of operation are possible. If the output pulses are influenced by the fronts of the input pulses in the squaring circuit 9, this arrangement will operate in the way substantially similar to that of the arrangement shown in FIG. 1 except that stabilization of the duration of the driving rectangular pulses will somewhat increase the quality of image edge formation since the edges will be similar over the entire picture field. If the output pulses (FIG. 19*e*) are triggered by the trailing edges of the input pulses (FIG. 19*d*) in the squaring circuit 9, the input video signals will be regenerated (FIGS. 19*a, b, c*) in a substantially different way from that described above. In the latter case, the video holding samplers 1, 2, 3 operate in the tracing mode only over short time intervals $t_0t_1$, $t_2t_3$ that immediately follow the fronts of the input video signals, otherwise they reproduce, at their output, (FIGS. 19*f, g, h*) their initial value. In such mode of operation, as can be seen, the areas between image edges will be completely free from noise as well as from low-frequency components of a video signal. Therefore, this operational mode is acceptable, if the video signals correspond to any video information for which the video signals are two-level ones, e.g. text, diagrams and other business information. Other cases require a different way of noise suppression.

Figure 20:
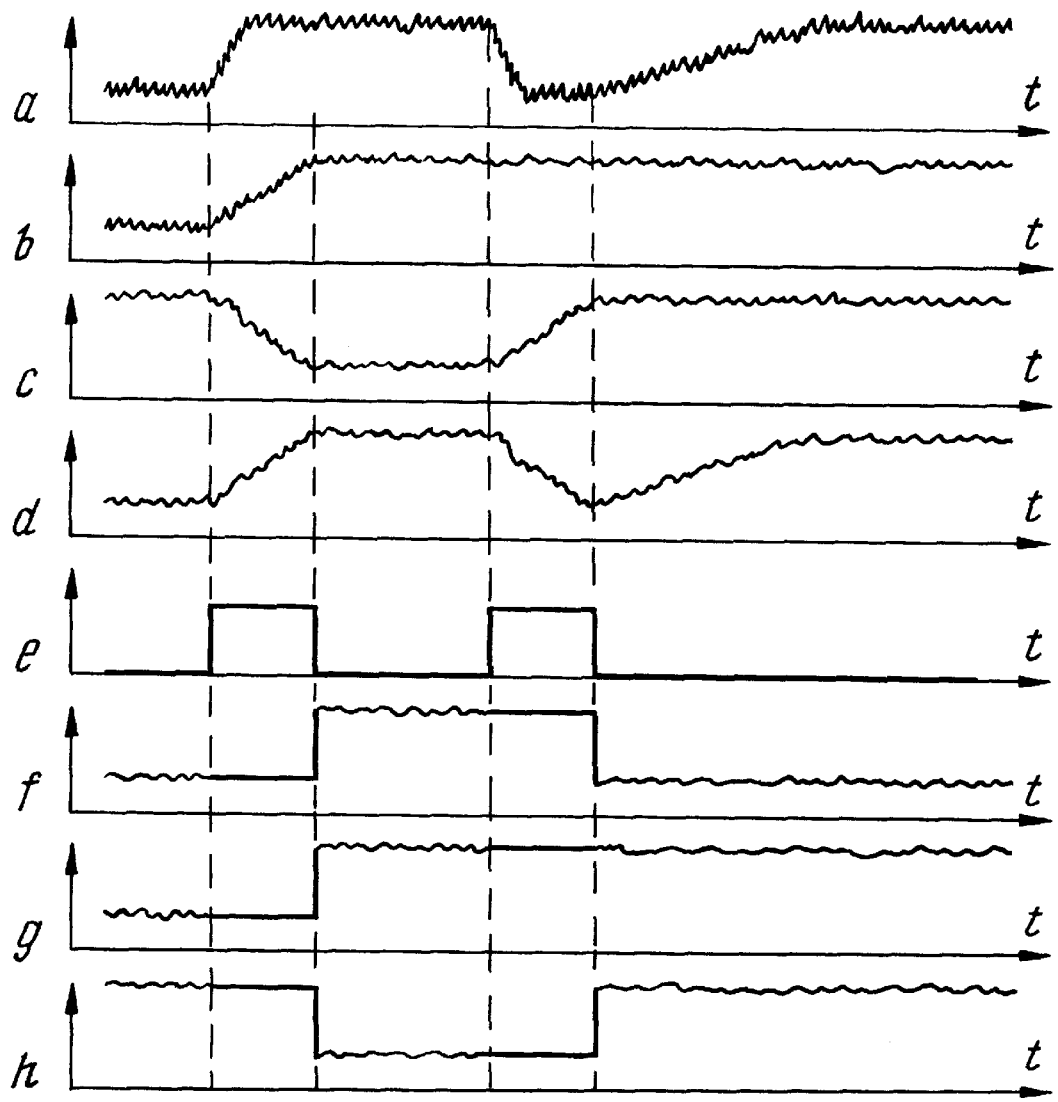
FIGS. 20*a, b, c, d, e, f, g, h* are timing diagrams illustrating the operation of the regenerator shown in FIGS. 5 and 6.

In order to decrease the level of noise in images use is made of the low-pass filter 10 (FIGS. 5, 6) which is fed with the widest-band video signal (FIG. 20*a*), i.e. a luminance video signal or green video signal. With this connection of the filter 10, due consideration is given for both a relatively higher sensitivity of the human eye to green than to blue and red, and a relatively somewhat lower noise level in the other two video signals (FIGS. 20*b, c*), i.e. red and blue or color-difference video signals due to corresponding narrow-band television channels. A video signal (FIG. 20*d*) at the output of the low-pass filter 10 has the same rise time as the narrow-band input video signals (FIGS. 20b, c). Since the duration of the rectangular pulses (FIG. 20e) applied to the driving inputs of the video holding samplers 1, 2, 3 in the instant arrangement is equal to the rising time of relatively the narrowest-band input video signals (FIGS. 20b, c), the low-pass filter 10 can increase the rising time of relatively the widest-band input video signal (FIG. 20a) to the same value (FIG. 20d), the noise level being correspondingly lowered. The video holding samplers 1, 2, 3 increase as above described the steepness of the fronts of the output video signals (FIGS. 20f, g, h), while the noise level over the other time intervals remains the same at both their inputs and outputs. Thus the noise level is decreased with the low-frequency component of the video signal being retained.

Figure 21:
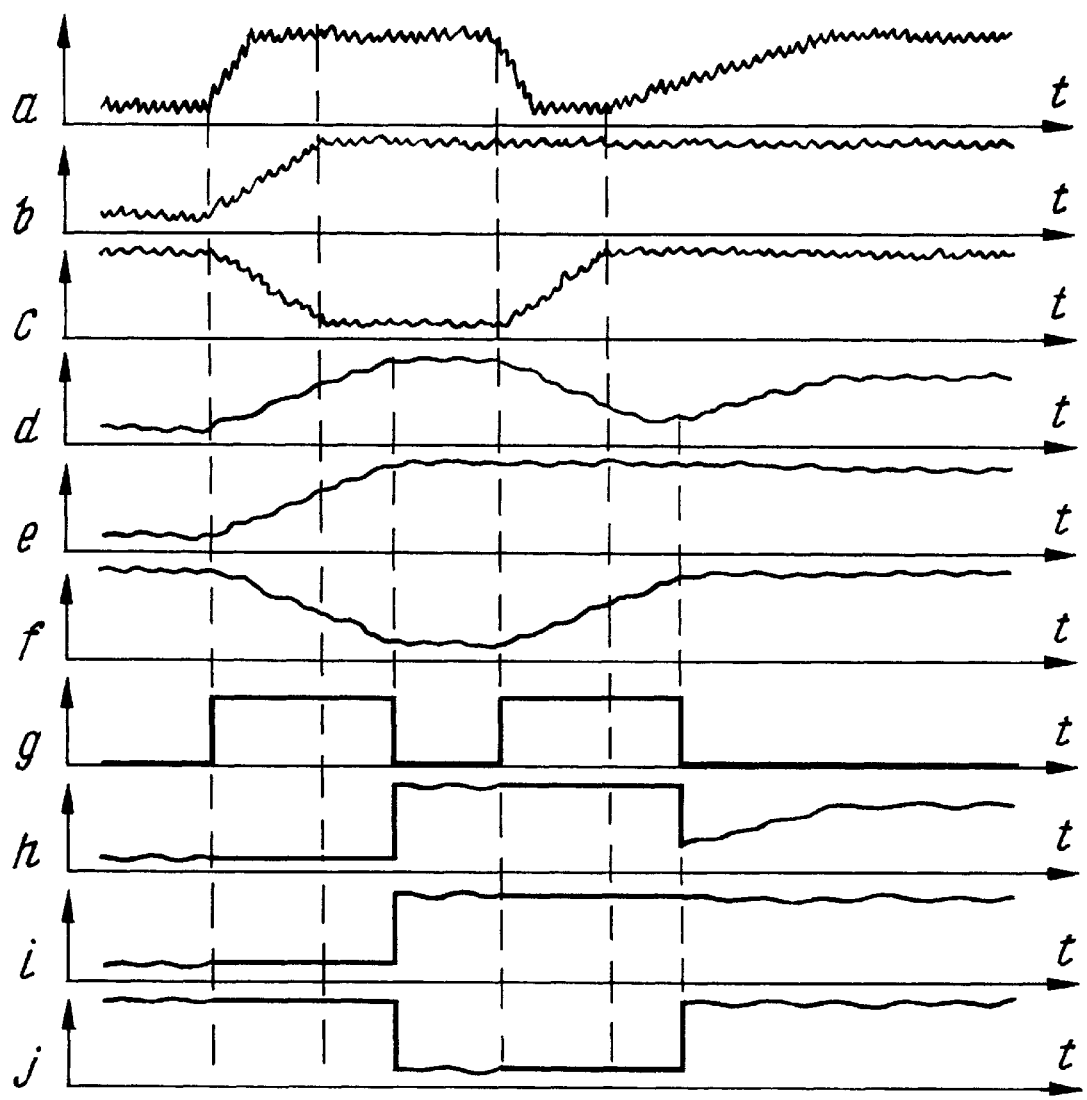
FIGS. 21*a, b, c, d, e, f, g, h, i, j* are timing diagrams illustrating the operation of the regenerator shown in FIGS. 7 and 8.

If the low-pass filters 10, 11, 12 are connected to the inputs of all the three video holding samplers 1, 2, 3, they can provide, due to a narrow pass-band, more vigorous noise suppression (FIGS. 21d, e, f) both in a relatively wider-band video signal (FIG. 21a) and in two other relatively narrower-band video signals (FIGS. 21b, c). Since, in doing this, the rise time of the video signals (FIGS. 21d, e, f) at the outputs of the low-pass filters 10, 11, 12 appears to be prolonged as compared to that of the input video signals (FIGS. 21a, b, c), the duration of the rectangular pulses (FIG. 21g) fed to the driving inputs of all the video holding samplers 1, 2, 3 is correspondingly increased. The high steepness of the fronts of the output video pulses (FIGS. 21h, i, j) is achieved by the video holding samplers 1, 2, 3 as described above.

Figure 8:
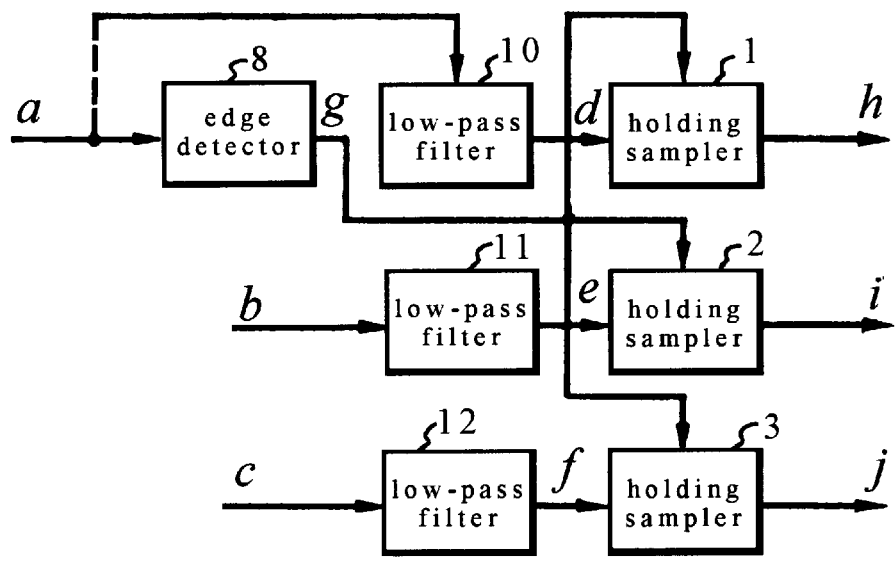
FIG. 8 is another construction of the regenerator incorporating a low-pass filter in each regeneration channel.

An arrangement represented in FIG. 8 by a functional block diagram provides for a decrease of the noise level in all the three input video signals with an increase in their front steepness in the same way as in the previously described arrangement.

Figure 22:
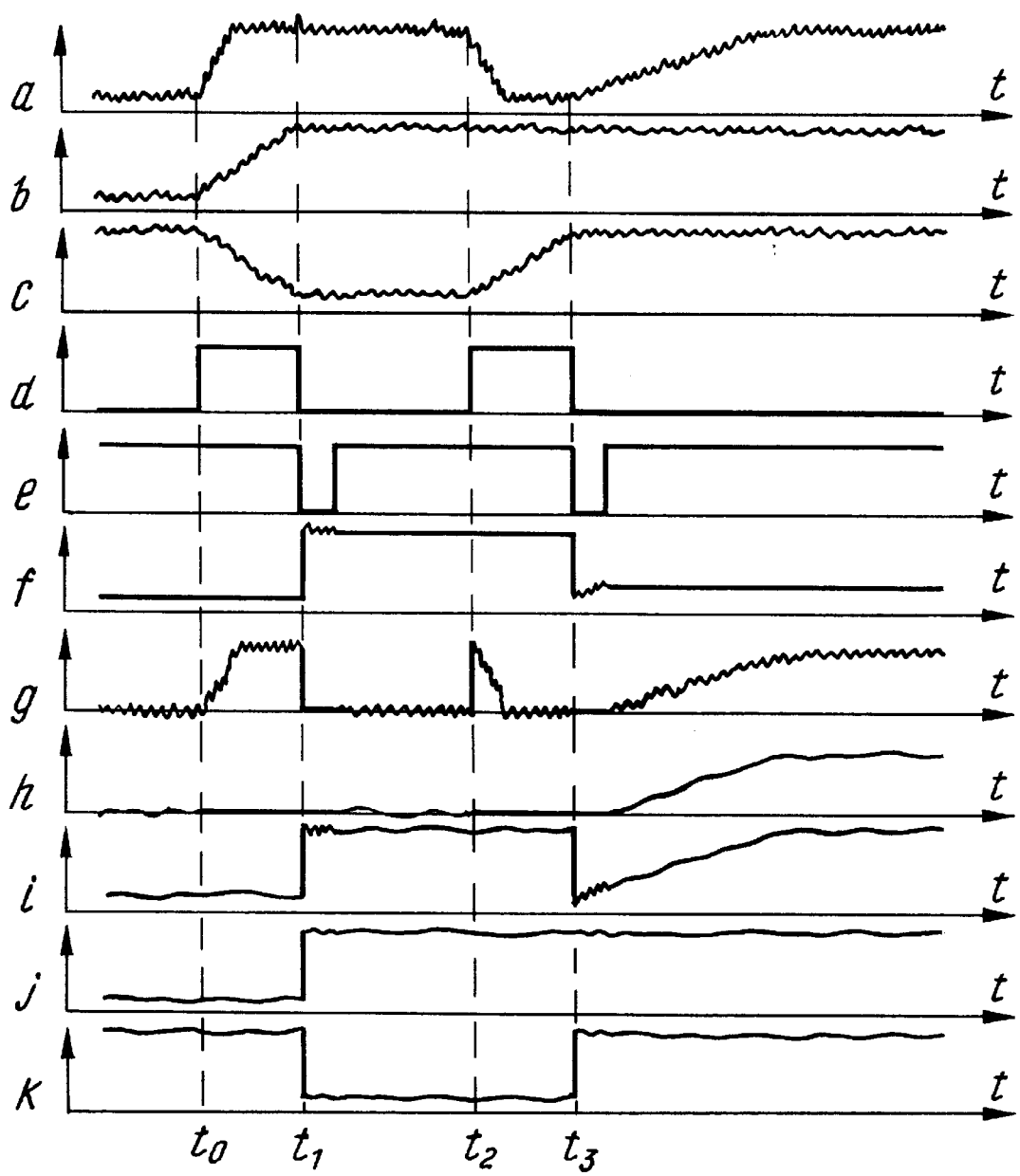
FIGS. 22*a, b, c, d, e, f, g, h, i, j, k* are timing diagrams illustrating the operation of the regenerator shown in FIGS. 9 and 10.

An arrangement represented in FIG. 9 by its functional block diagram can ensure a significantly better suppression of high-frequency and middle-frequency interference because just that very arrangement reduces noise in low-frequency components of the video signals rather than in the video signals per se. That is why without sacrificing the resolution of relatively small pels it becomes possible to use low-pass filters with a narrower band and therefore, a more pronounced noise suppression. This is effected as follows. In the video holding samplers 1, 2, 3, the output signals (FIGS. 22a, b, c) are derived from the input signals in the same way as in the arrangement of FIG. 3. Suitable transformations of video signals will further be explained by way of example in one channel which corresponds to relatively the widest-band input video signal (FIG. 22a). More specifically, a rectangular pulse (FIG. 22d) is generated at the output of the OR circuit 4, the trailing edge of the pulse triggering the squaring circuit 9 (FIG. 22e).

In the first adder 13 an algebraic sum is formed, with the addition of an input signal (FIG. 22a) and a signal (FIG. 22f) derived therefrom at the output of the video holding sampler 1, which are opposite in sign. In such a difference of signals (FIG. 22g) the interference is flattened by the integrating circuit 14 and in response to the pulses coming out of the OR circuit 4 (FIG. 22d) and over the time intervals $t_0 t_1$, $t_2 t_3$ that correspond to the pulses, the output signal (FIG. 22h) is zeroed. The low-frequency video signal (FIG. 22h) component that was cleared from the high-frequency noise as hereinbefore described is added, in the second adder 15, to the high-frequency component of the same signal (FIG. 22f) that is picked off the output of the video holding sampler 1 to thereby provide for the regeneration of the input video signals (FIGS. 22a, b, c) to have restored output video signals (FIGS. 22i, j, k).

Figure 10:
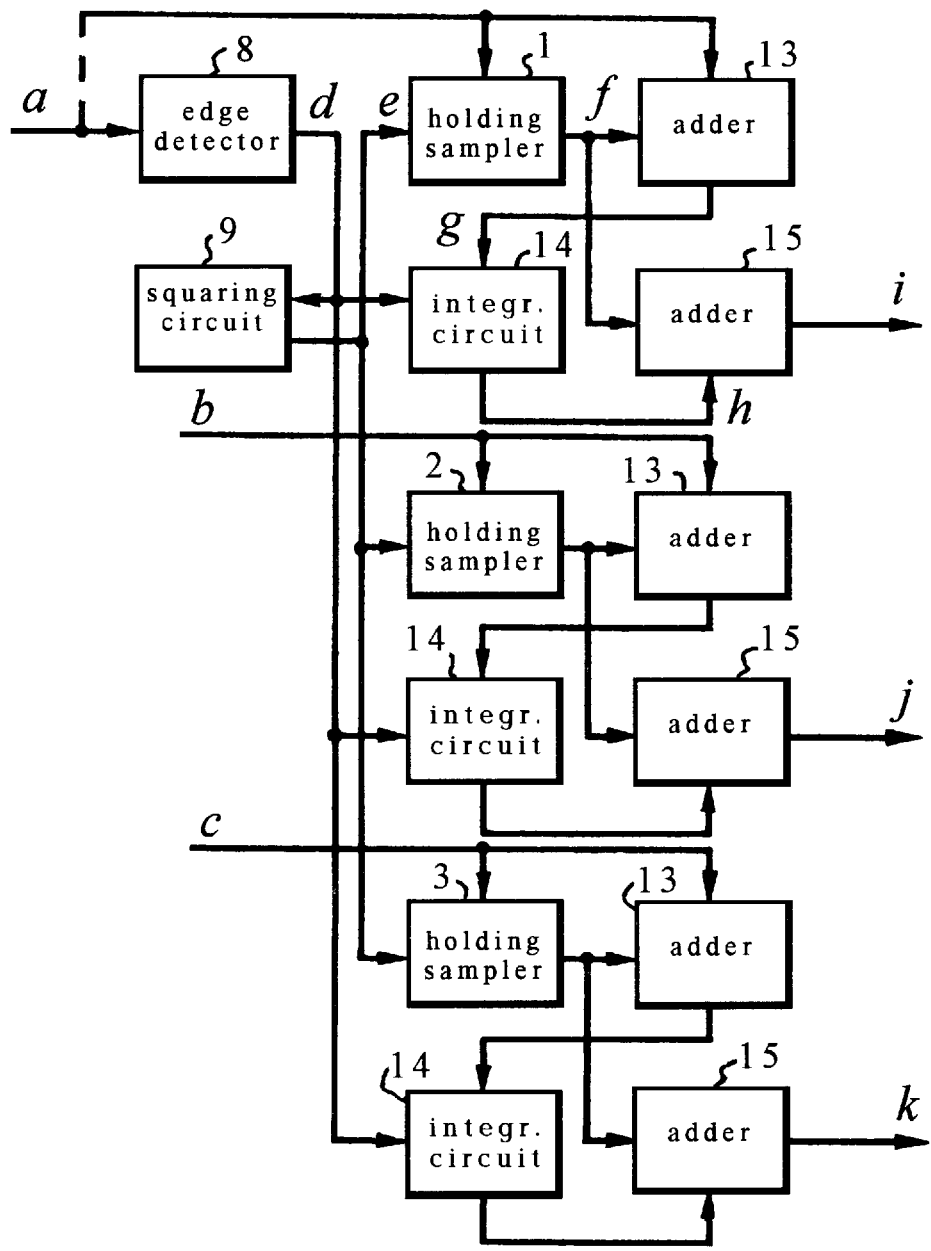
FIG. 10 is the same regenerator with adders constructed in a different way.

An arrangement represented in FIG. 10 by its functional block diagram provides for a rather high quality of video signal regeneration by separate solutions of the problem of increasing the steepness of the leading edges of the initial video signal and of suppressing high-frequency and medium-frequency noise of the low-frequency component of the video signal.

Figure 23:
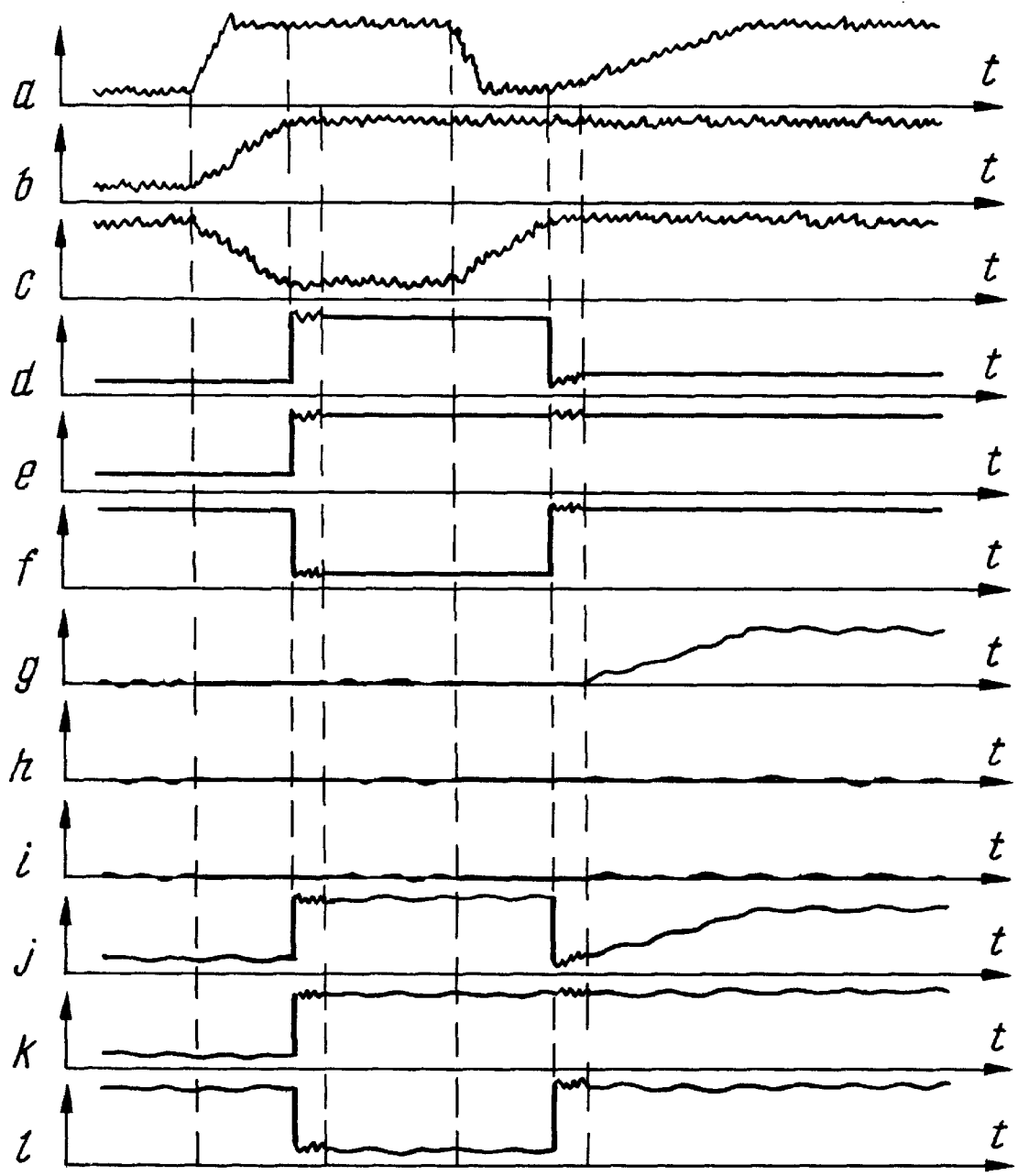
FIGS. 23*a, b, c, d, e, f, g, h, i, j, k, l* are timing diagrams illustrating the operation of the regenerator shown in FIGS. 11 and 12.

In an arrangement represented in FIG. 11 by its functional block diagram the separeted regeneration of the high-frequency and low-frequency components of the input video signals followed by their summation is applied in a different way than in the previously described arrangement. This is effected as follows. In the video holding samplers 1, 2, 3, noise-free output signals (FIGS. 24d, e, f) corresponding to their high-frequency components are derived from the input video signals (FIGS. 23a, b, c) in the same way as in the arrangement of FIG. 3. Simultaneously in the same way as in the arrangement of FIG. 1, steep-rise signals (FIGS. 18e, f, g) are also generated but comprising a noisy low-frequency component of the input video signal. In the first adder 17, the low-frequency components of the input signals, which are relieved of noise (FIGS. 23g, h, i) in the low-pass filters 18, are derived as a result of algebraic summation, i.e. taking into consideration the opposite signs of the addends. In the second adder 19, an efficient regeneration (FIGS. 23j, k, l) is provided as a result of combining noise relieved high-frequency (FIGS. 23d, e, f) and low-frequency (FIGS. 23g, h, i) components of the input video signals (FIGS. 23a, b, c).

In an arrangement represented in FIG. 12 by its functional block diagram, video signals are regenerated in the same manner as described just above.

Figure 24:
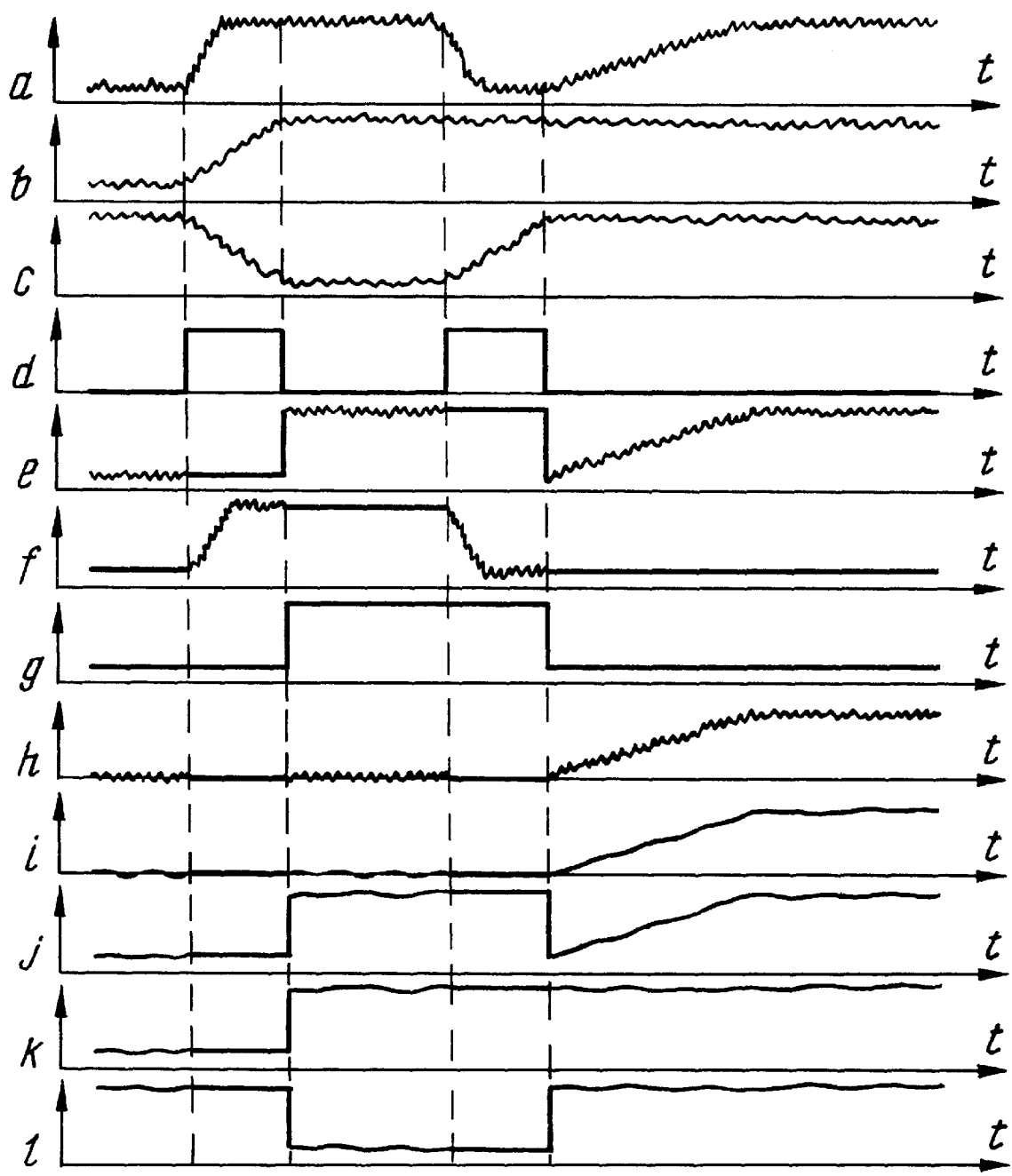
FIGS. 24*a, b, c, d, e, f, g, h, i, j, k, l* are timing diagrams illustrating the operation of the regenerator shown in FIGS. 13 and 14.

In an arrangement represented in FIGS. 13 and 14 by its functional block diagram the output video signals are regenerated in the process of the separated regeneration of their high-frequency and low-frequency components followed by the summation thereof but the high-frequency components are generated in a somewhat different way. For the sake of definiteness this process will be explained as applied to the regeneration channel for relatively the widest-band signal (FIG. 24a) of the input video signals (FIGS. 24a, b, c). In the first video holding sampler 1 as in the arrangement of FIG. 1, in response to the driving rectangular pulses (FIG. 24d), a steep-rise edge is generated and, along with it, having the noisy low-frequency component of the input signal (FIG. 24e). In the second video holding sampler 16, an input video signal generates a signal comprising, on the contrary, the same fronts as at the input but having no low-frequency component (FIG. 24f). The electronic switching unit 21 combines these two signals to shape a signal (FIG. 24g) which is the high-frequency component of a noise-free input video signal. In the first adder 17, the algebraic summation of the output signals from the first video holding sampler 1 and from the electronic switching unit 21 provides the noisy low-frequency component of the input video signal (FIG. 24h), which component being relieved of the noise in the low-pass filter 18 (FIG. 24i). It is the summation of the high-frequency (FIG. 24g) and the low-frequency (FIG. 24i) input video signal components derived in the second adder 19 as hereinbefore described that provides for the regeneration of the video signal (FIG. 24j). Similarly, in the two other channels of the regenerator, the two other relatively narrower-band input video signals (FIGS. 24b, c) are generated to produce restored output video signals (FIGS. 24k, l).

In the video signal front detector 5, 6, 7 represented in FIG. 15 by its functional block diagram, due to a very fast time constant of the integrating circuit 22 the values of a signal at the inputs of the exclusive OR circuit 23 do not differ noticably unless the input video signal changes in magnitude quickly and considerably, i.e. while the fronts thereof do exist. At this time, at the output of the exclusive OR circuit 23 there appear the pulses that trigger the squaring circuit 24 (e.g. a comparator).

In the video signal front detector 5, 6, 7 represented in FIG. 16 by its functional block diagram, the input video signal is differentiated by the differentiating circuit 25, rectified by the full-wave rectifier 26, and is fed to one input of the adder 27. The other input of the adder 27 is supplied with that same rectified signal that was additionally flattened in the low-pass filter 28. Due to algebraic summation there is ensured a dynamic bias of the rectified signal with due account for the noise level in the input video signal. In the squaring circuit 24, as a result, protection is accomplished against misoperation of the video signal front detector 5, 6, 7 under the action of high-level impulse noise. Without such protection there would be an increased luminosity of the high-level noise which is undesirable.

Figure 17:
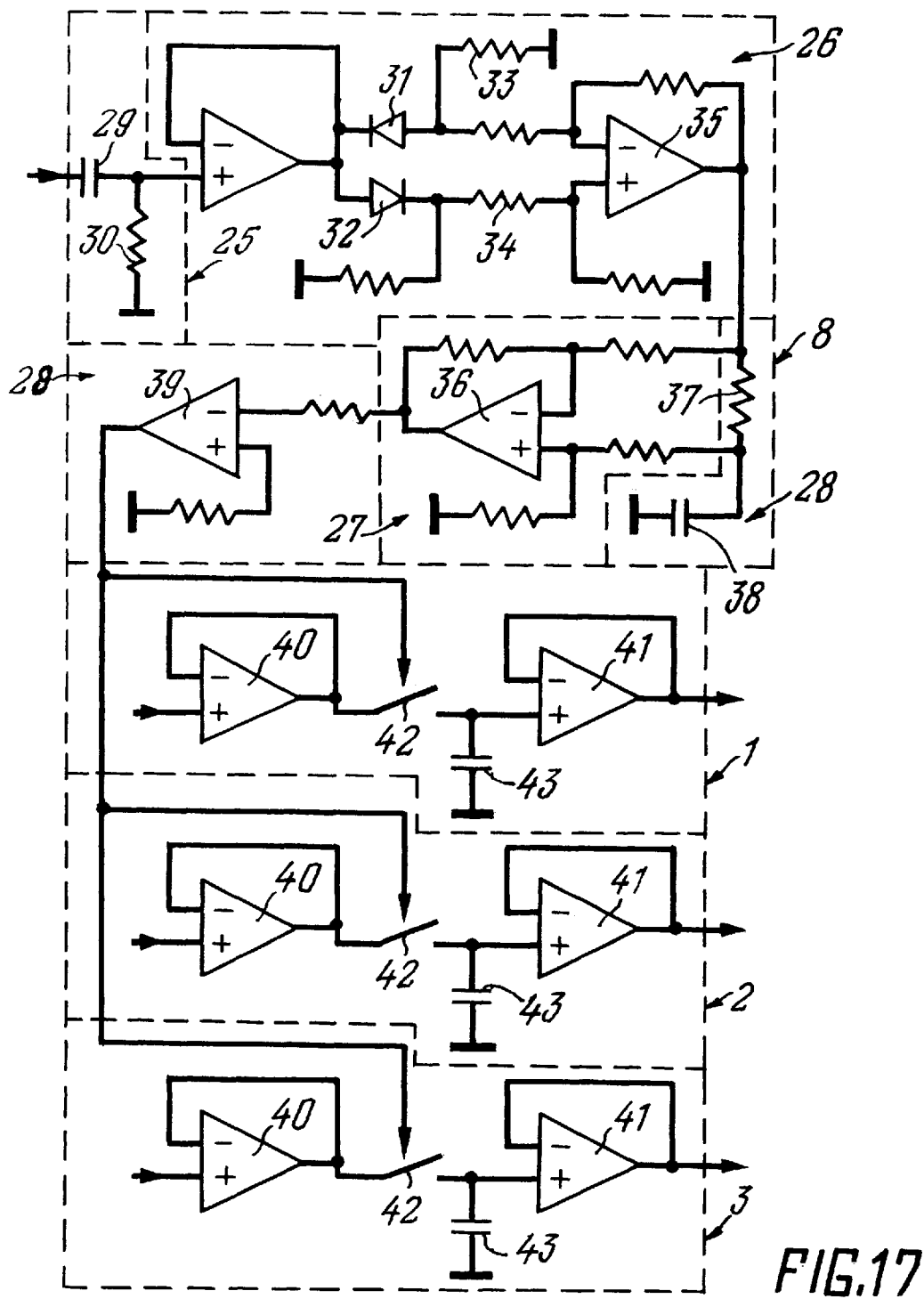
FIG. 17 is an electrical schematic diagram of the video signal regenerator according to the invention.

Operation of the arrangement represented in FIG. 17 by its simplified schematic diagram was fully discussed hereinabove in describing the functional block diagrams of FIG. 1 and FIG. 17.

An advantage of the invention consists in a considerable increase in the steepness of the fronts of the regenerated video signals that is corresponding to a decrease in the rise time to 20–50 ns with a simultaneous additional decrease in their noise level down to 20 db. This, in the final analysis, provides for an improvement in the quality of the television picture to a practically comfortable level. A simultaneous decrease in the physiologic redundancy of the picture, provided by the invention due to suppression of small noise-like television picture elements along with noise, substantially lowers eye strain in televiewers.

Industrial Applicability

The invention can be used in the television equipment for a variety of purposes in generation, broadcasting, and reproduction of video signals in color television. It can be specifically used in television receivers, television cameras, video tape recorders and other equipment for recording video signals.

I claim:

1. A video signal regenerator for color television comprising first and second video signal regeneration channels, having inputs for receiving respective first and second video signals each of said channels having a video signal front detector electrically connected to a driving input of a video holding sampler; characterized in that the video signal regenerator further comprises a third video signal regeneration channel having an input for receiving a third video signal of a pass-band wider than that of said first or second video signals, said third channel being similar to said first and second regeneration channels and also comprising a video signal front detector electrically connected to a driving input of the video holding sampler, each said video holding sampler having a signal input connected to one of respective said first, second and third video signals, said signal input being distinct from said driving input.

2. The video signal regenerator according to claim 1 characterized in that the video signal front detector (5–7) is electrically connected to the video holding sampler (1–3) in each regeneration channel through a common OR circuit (4) having inputs connected to the outputs of the video signal front detectors (5–7) and the output connected to the driving inputs of the video holding samplers (1–3).

3. The video signal regenerator according to claim 2 characterized in that the output of the OR circuit (4) is connected to the input of a squaring circuit (9) the output of which is connected to the driving inputs of all the video holding samplers (1–3).

4. The video signal regenerator according to claim 3 characterized in that each video signal regeneration channel comprises a first adder (13) having one input whereto a video signal is applied, while the other input being connected to the output of the video holding sampler (1–3), an integrating circuit (14), the video input thereof being connected to the output of the first adder (13), while the zero adjustment input being connected to the output of the OR circuit (4), and a second adder (15), the inputs thereof being connected to the outputs of the integrating circuit (14) and of the video holding sampler (1–3), while the output thereof being the output of a video signal regeneration channel.

5. The video signal regenerator according to claim 3 characterized in that each video signal regeneration channel comprises a second video holding sampler (16) having a video input whereto a corresponding video signal is applied, while the driving input thereof being connected to the output of the OR circuit (4), a first adder (17), the input thereof being connected to the outputs of the first and the second video holding samplers (1–3 and 16), while the output thereof being connected to a low-pass filter (18), and a second adder (19) the inputs of which are connected to the output of the first video holding sampler (1–3) and to the output of the low-pass filter (18).

6. The video signal regenerator according to claim 2 characterized in that it further comprises a low-pass filter (10) having an output connected to the video input of at least one video sampler (1–3).

7. The video signal regenerator according to claim 2 characterized in that it further comprises a NOT circuit (20) having an input connected to the output of the OR circuit (4), and wherein each video signal regeneration channel comprises a second video holding sampler (16) having a video input whereto a video signal is applied, while the driving input is connected to the output of the NOT circuit (20), an electronic switching unit (21) having video inputs whereto the outputs of the first and the second video holding samplers (1–3, 16) are connected, while the driving input thereof is connected to the output of the OR circuit (4), a first adder (17) having inputs connected to the outputs of the first video holding sampler (1–3) and of the electronic switching unit (21), while the output thereof is connected to the input of a low-pass filter (18), and a second adder (19) having inputs connected to the output of the low-pass filter (18) and of the electronic switching unit (21), while the output thereof is an output of the video signal regeneration channel.

8. The video signal regenerator according to claim 2 characterized in that it further comprises a NOT circuit (20) having an input connected to the output of the edge detector (8), and wherein each video signal regeneration channel comprises a second video holding sampler (16) having a video input to which a video signal is applied and the driving input connected to the output of the NOT circuit (20), an electronic switching unit (21) having video inputs to which the outputs of the first and the second video holding samplers (1–3, 16) are connected and the driving input connected to the output of the edge detector (8), a first adder (17) having inputs connected to the outputs of the first video holding sampler (1–3) and of the electronic switching unit (21) and the output connected to the input of a low-pass filter (18), and a second adder (19) having inputs connected to the output of the low-pass filter (18) and of the electronic switching unit (21), while the output thereof being the output of the video signal regeneration channel.

9. The video signal regenerator according to claim 1 characterized in that the video signal front detectors (5–7) of all the channels are combined with the OR circuit (4) to form an integral edge detector (8) the input of which is fed with a video signal of a wider band than the other video signals.

10. The video signal regenerator according to claim 9 characterized in that the edge detector (8) receives a picture luminance signal, while the video input of each video holding sampler (1–3) receives a color picture signal.

11. The video signal regenerator according to claim 9 characterized in that the output of the edge detector (8) is connected to the input of the squaring circuit (9) the output of which is connected to the driving inputs of all the video holding samplers (1–3).

12. The video signal regenerator according to claim 11 characterized in that each video signal regeneration channel comprises a first adder (13) having one input whereto a video signal is applied, while the other input being connected to the output of the video holding sampler (1–3), an integrating circuit (14), the video input thereof being connected to the output of the first adder (13), while the zero adjustment input being connected to the output of the squaring circuit (9), and a second adder (15), the inputs thereof being connected to the outputs of the integrating circuit (14) and of the video holding sampler (1–3), while the output thereof being the output of a video signal regeneration channel.

13. The video signal regenerator according to claim 11 characterized in that each video signal regeneration channel comprises a second video holding sampler (16) having a video input whereto a corresponding video signal is applied, while the driving input thereof being connected to the output of the edge detector (8), a first adder (17) having inputs whereto the outputs of the first and the second video holding samplers (1–3, 16) are connected and an output whereto a low-pass filter (18) is connected, and a second adder (19) having inputs whereto the output of the first video sampler (1–3) and the output of the low-pass filter (18) are connected.

* * * * *

UNITED STATES PATENT AND TRADEMARK OFFICE
CERTIFICATE OF CORRECTION

PATENT NO. : 5,808,696
DATED : September 15, 1998
INVENTOR(S) : ANTONOV

It is certified that error appears in the above-identified patent and that said Letters Patent is hereby corrected as shown below:

On the Cover Page of the Patent, Column 1, on the line after "United States Patent [19]", delete "Alexandrovich", and substitute —Antonov—; and on the line after the line reading "OTHER TWO CHANNELS", delete "[76] Inventor: Antonov Alexandr Alexandrovich, 164", and substitute —[76] Inventor: Alexandr Alexandrovich Antonov, 164—.

Signed and Sealed this

Twenty-ninth Day of August, 2000

*Attest:*

Q. TODD DICKINSON

*Attesting Officer*         *Director of Patents and Trademarks*